(12) United States Patent
Takagi

(10) Patent No.: US 7,703,799 B2
(45) Date of Patent: Apr. 27, 2010

(54) AIRBAG MODULE COVER

(75) Inventor: Mamoru Takagi, Fuji (JP)

(73) Assignee: Nihon Plast Co., Ltd. (JP)

( * ) Notice: Subject to any disclaimer, the term of this patent is extended or adjusted under 35 U.S.C. 154(b) by 0 days.

(21) Appl. No.: 11/878,584

(22) Filed: Jul. 25, 2007

(65) Prior Publication Data

US 2008/0036184 A1 Feb. 14, 2008

(30) Foreign Application Priority Data

Aug. 9, 2006 (JP) ............................. 2006-217094

(51) Int. Cl.
*B60R 21/20* (2006.01)
(52) U.S. Cl. .................... 280/728.3; 280/731
(58) Field of Classification Search .............. 280/728.3, 280/731, 732
See application file for complete search history.

(56) References Cited

U.S. PATENT DOCUMENTS

| | | | | |
|---|---|---|---|---|
| 4,989,895 A | * | 2/1991 | Pearson et al. | 280/731 |
| 5,004,266 A | * | 4/1991 | Miller et al. | 280/743.2 |
| 5,615,907 A | * | 4/1997 | Stanger | 280/728.2 |
| 6,142,510 A | * | 11/2000 | Endo et al. | 280/731 |
| 6,168,187 B1 | * | 1/2001 | Yamada et al. | 280/728.3 |
| 6,672,614 B2 | * | 1/2004 | Endo et al. | 280/731 |
| 2002/0030352 A1 | * | 3/2002 | Iida et al. | 280/728.3 |

FOREIGN PATENT DOCUMENTS

JP 05-262194 10/1993

\* cited by examiner

*Primary Examiner*—Paul N. Dickson
*Assistant Examiner*—Timothy Wilhelm
(74) *Attorney, Agent, or Firm*—NDQ&M Watchstone LLP

(57) ABSTRACT

In an airbag module cover, at least one pair of tear lines is provided on a double-wall portion (an inner side wall and an outer side wall). The tear line provided on the inner side wall is formed as a slit. The tear line provided on the outer side wall is formed as a groove. Therefore, strength of the double-wall portion is reduced to tear the tear lines unfailingly and torn module cover can be opened unfailingly as a deployment door by an inflating airbag.

3 Claims, 10 Drawing Sheets

AIRBAG MODULE COVER

BACKGROUND OF THE INVENTION

1. Field of the Invention

The present invention relates to an airbag module cover.

2. Description of the Related Art

Generally, an airbag module has an airbag module cover as an outer shell. In a normal condition (inactive condition), the airbag module cover contains the airbag components such as a folded airbag, an inflator, and so on within its annular wall. In an airbag deployment condition (operating condition), the airbag module cover receives a pressure load from an inflating airbag and is torn along tear lines provided on a back surface of the cover. Then, the torn cover can open as deployment doors and the airbag inflates out from the deployment doors. The airbag module cover mostly has a double-wall structure due to a requisition of an appearance design. An outer wall(s) is provided outside the above-mentioned annular wall in order to provide a better appearance. The airbag module cover, which has overlapped tear lines respectively provided on the double-wall structure, is disclosed (Laid-open Japanese Patent Application No. H5[1993]-262194). The tear lines are formed as grooves having thin-thickness in the above-mentioned airbag module cover.

SUMMARY OF THE INVENTION

However, the double-wall structure has higher physical strength than a single-wall structure. Therefore, the tear lines on the double-wall structure tend to be hard to be torn. Thus, in order to tear the tear lines unfailingly, the tear lines may be formed in succession from a tearing initial point to the double-wall portion. But this results in that designing a pattern of the tear lines becomes hard.

An object of the present invention is providing an airbag module cover which can be torn along a tear line(s) provided at a double-wall portion.

A first aspect of the present invention provides an airbag module cover which comprises: at least one inner side wall for surrounding a folded airbag; at least one outer side wall provided outside the inner side wall; and tear lines to be torn by a pressure of an inflating airbag. The tear lines includes at least one first tear line provided on the inner side wall and at least one second tear line corresponding to the first tear line and provided on the outer side wall. The first tear line is formed as a slit, and the second tear line is formed as a groove.

A second aspect of the present invention provides an airbag module cover which comprises: at least one inner side wall for surrounding a folded airbag; at least one outer side wall provided outside the inner side wall; and tear lines to be torn by a pressure of an inflating airbag. The tear lines includes at least one first tear line provided on the inner side wall and at least one second tear line corresponding to the first tear line and provided on the outer side wall. The second tear line is formed as a groove, and the first tear line is formed as a groove having thinner-thickness than the second tear line.

DETAILED DESCRIPTION OF THE INVENTION

Figure 1:
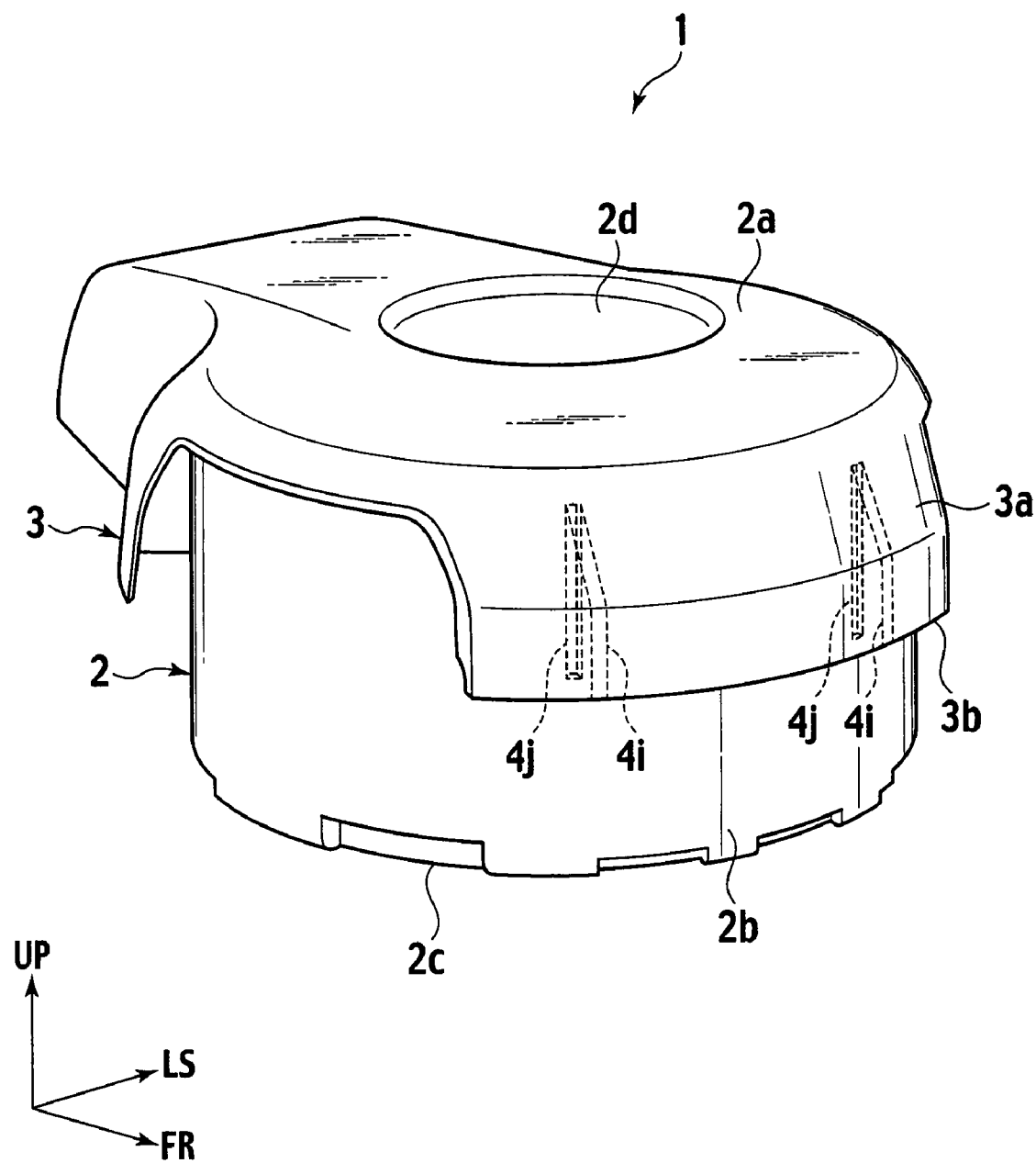
FIG. 1 is a perspective view of an airbag module cover (in a normal condition before being torn) according to a first embodiment of the present invention.

Hereinafter, embodiments of the present invention will be described with reference to the drawings. In addition, an airbag module cover for a driver-side airbag module installed on a steering wheel will be described as the embodiment hereinbelow. And, directions are defined here for an easily understandable explanation. In the drawings, "UP" represents upward direction, "FR" represents forward direction, and "LS" represents to-the-left-side direction.

At First, a first embodiment of the present invention will be described with reference to FIGS. 1 to 6. An airbag module cover 1 of the present embodiment is molded of synthetic resin. The module cover 1 comprises an inner annular cup portion 2 and an outer shell portion 3 which is provided around the inner annular cup portion 2. The inner annular cup portion is provided with a top wall 2a which is corresponding to a bottom of a cup and an inner side wall 2b. The outer shell portion 3 has an outer side wall 3a which extends from a peripheral edge of the top wall 2a and along the inner side wall 2b. In other words, the inner annular cup portion 2 and the outer shell portion 3 are integrally connected at the peripheral edge of the top wall 2a.

At some areas on the front and back portions of the module cover 1, a double-wall structure is constructed by the inner side wall 2b and the outer side wall 3a. This double-wall structure provides an effective containing/holding capability of airbag components (not shown in drawings) and a good installability onto the steering wheel by the inner side wall 2a, and a good appearance by the outer side wall 3a.

The module cover 1, in a normal condition (inactive condition before being torn) shown in FIGS. 1 to 4, contains the airbag components including a folded airbag within the inner annular cup portion 2. Thus, the airbag components are surrounded by the top wall 2a and the inner side wall 2b. Furthermore, a bracket (base-plate) is attached to the inner annular cup portion 2 to close an opening 2c of the inner annular cup portion 2.

Tear lines 4a to 4j are provided on the top wall 2a, the inner side wall 2b, and the outer side wall 3a. The tear lines 4a to 4j are torn by pressure load of a deploying airbag at a vehicle collision. The pressure load applies to the tear lines 4a to 4j from inside to outside of the module cover 1 so as to tear the tear lines 4a to 4j. The tear lines 4a to 4j are formed as grooves or slits.

The tear lines 4a to 4i except the tear lines 4j are formed as thin-thickness grooves which has thinner-thickness than the other portions of the walls 2a, 2b, and 3a. The strength of the tear lines 4a to 4i is weakened by the thin-thickness so as to be torn by the pressure load of the deploying airbag. Generally, the grooved tear lines are provided on the back surface of the module cover to prevent an uncomfortable outer appearance.

The tear lines 4j are formed as slits which are the conditions of already being torn. This configuration of forming the tear lines 4j accelerates the propagation of the tearing.

Figure 2:
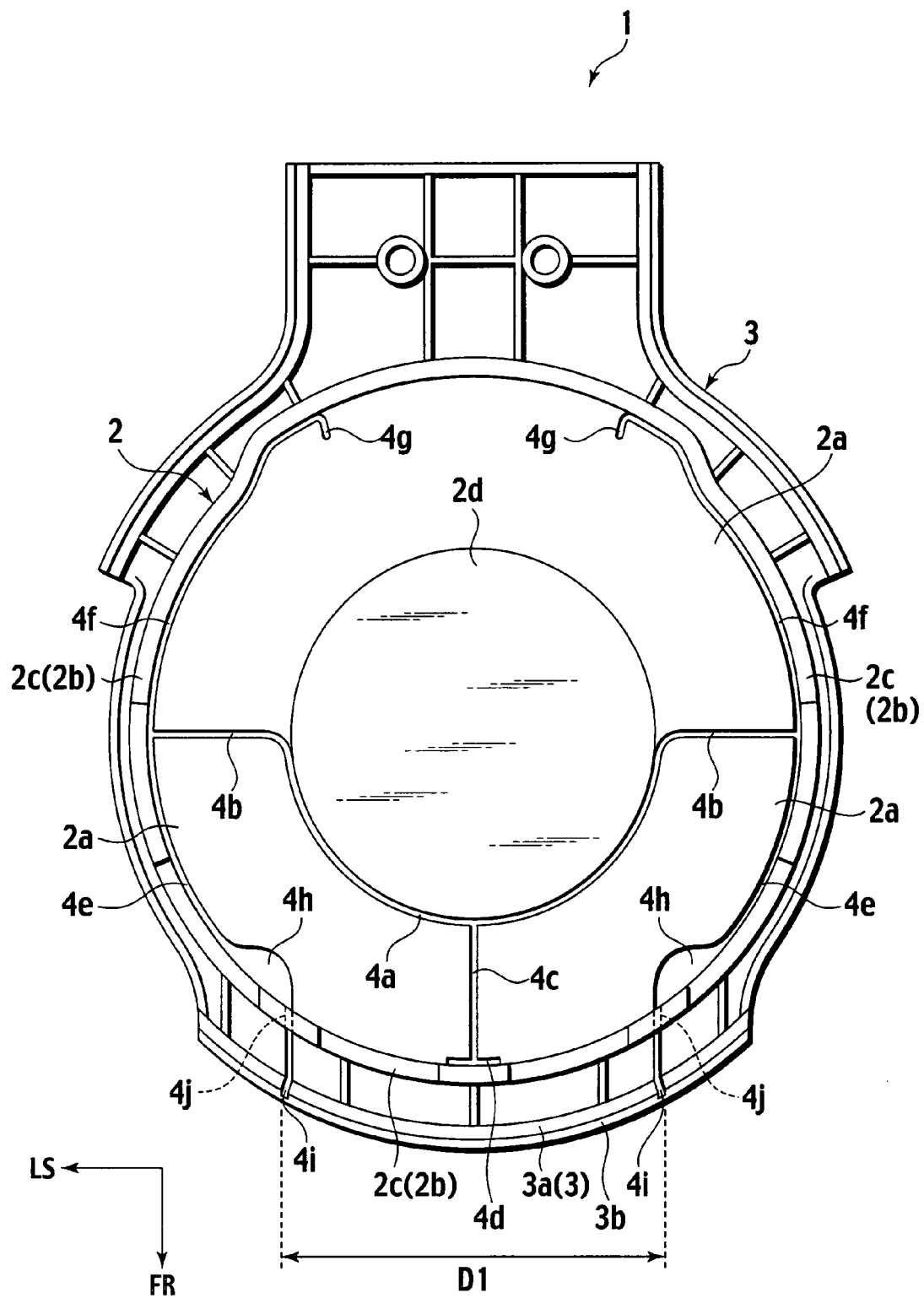
FIG. 2 is a bottom plan view (a back surface) of the airbag module shown in FIG. 1.

Specifically, as shown in FIG. 2, the semi-circular tear line 4a is provided along a circular center area 2d of the top wall 2a. The tear line 4a has a forward curvature. A pair of the tear lines 4b extends linearly and laterally. Each of the tear lines 4b extends from the end of the tear line 4a to the periphery edge of the top wall 2a (to the connection line between the top wall 2a and the side walls 2b, 3a). Furthermore, the tear line 4c extends toward from the center (the front-most point) of the tear line 4a to the periphery edge of the top wall 2a. The short tear line (terminating tear line) 4d is provided on the front end of the tear line 4c along the periphery edge of the top wall 2a. The tear line 4d extends laterally to the left and right. The tear lines 4c, 4d are positioned so as to form "T".

A pair of the tear lines 4e extends forward from the outer ends of the tear lines 4b along the periphery edge of the top wall 2a. Also, a pair of the tear lines 4f extends backward from the outer ends of the tear lines 4b along the periphery edge of the top wall 2a. Each of the tear lines 4f is terminated before the rear-most point of the top wall 2a. At the each rear end of the tear lines 4f, the short tear line (hook-like terminating tear line) 4g is provided respectively. The tear lines 4g extend toward the center of the top wall 2a.

Each of the tear lines 4e is connected to both the tear line 4i which extends on the outer side wall 3a and the tear line 4j which extends on the inner side wall 2b via the wide tear line 4h.

Figure 3:
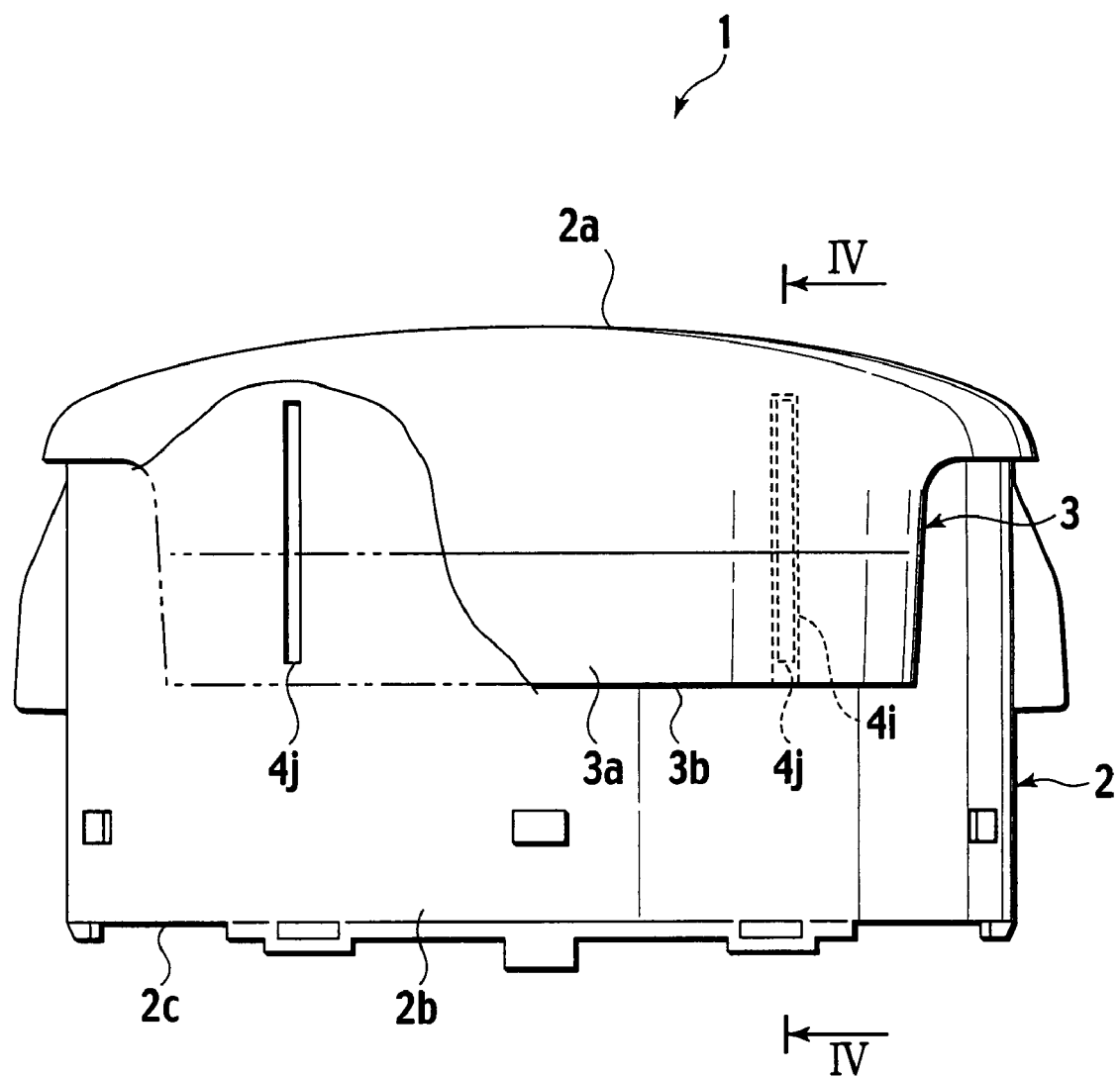
FIG. 3 is a side view (partially cut-off) of an upper portion of the airbag module cover shown in FIG. 1.
Figure 4:
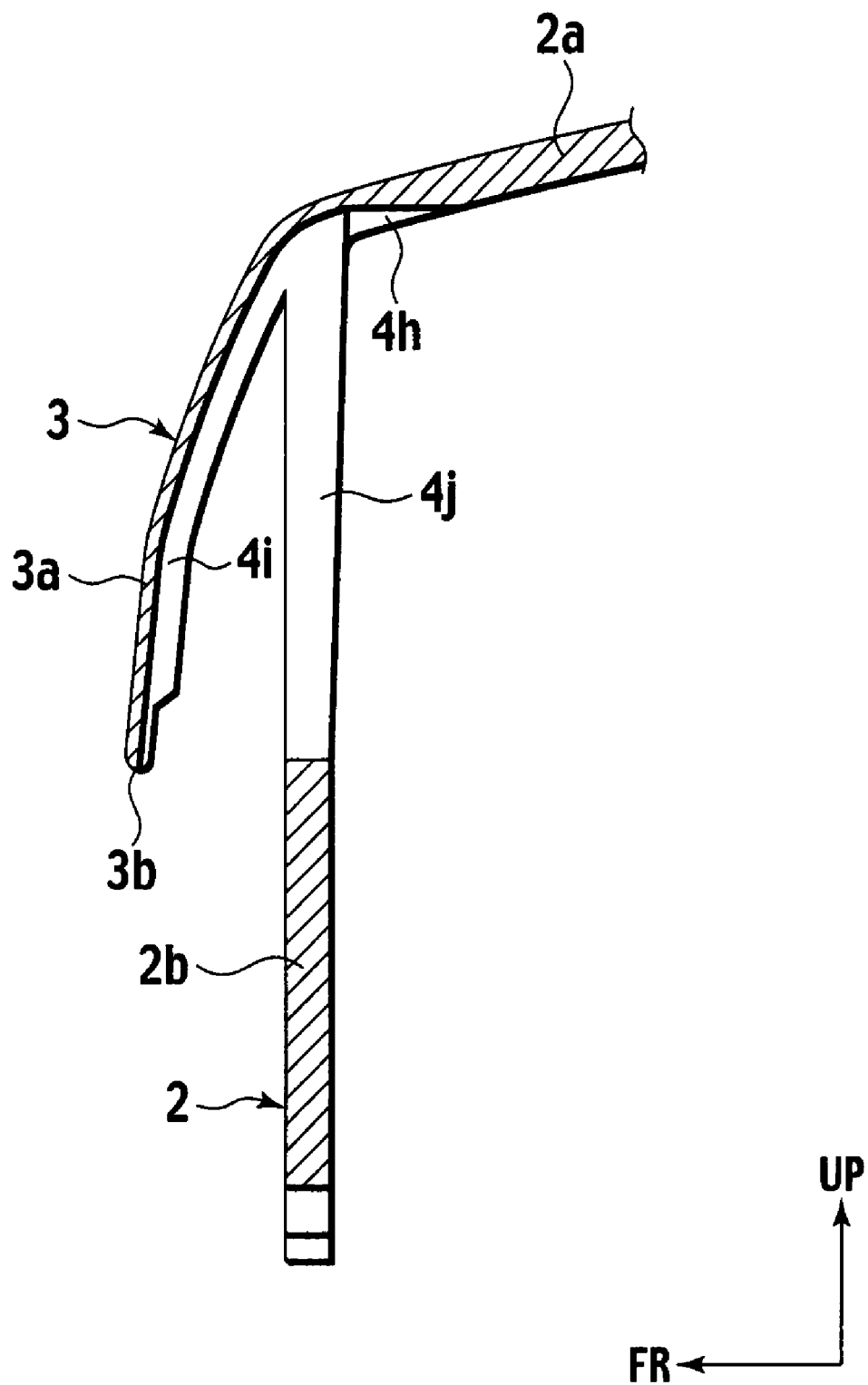
FIG. 4 is a cross-sectional view taken along the line IV-IV shown in FIG. 3.

In other words, in the double-wall structure configured by the inner side wall 2b and the outer side wall 3a, as shown in FIGS. 1, 3, and 4, two pairs of the overlapped tear lines 4i, 4j are provided parallel in the view from the front. The two pairs of the tear lines 4i, 4j are provided mirror-symmetrically on the walls 2b, 3a with respect to the longitudinal center line of the module cover 1. The tear lines 4j provided on the inner side wall 2b are formed as the slits. The lower-most ends of the tear lines 4j are positioned slightly above the lower-most edge 3b of the outer side wall 3a. In addition, the tear lines 4i provided on the outer side wall 3a are formed as thin-thickness portions (the thin-thickness grooves). The tear lines 4i extend to the lower-most edge 3b, respectively.

Each of the wide tear lines 4h functions as a tearing start point of the tear lines 4i, 4j. The thin-thickness groove of the each tear lines 4h is widened towards the center of the top wall 2a. Thus, the strength of the wide tear line 4h is further reduced. Furthermore, the wide tear line 4h connects the tear line 4e to the tear lines 4i, 4j smoothly. Then, tearing force can run along the tear lines 4e to 4i, 4j smoothly.

In the above-mentioned structure, the center area 2d of the top wall 2a is pressed from the inside by the inflating airbag after the air bag module has been activated to be inflated. Then, the semi-circular tear line 4a and the linear tear line 4c are torn by the pressure. Next, the tear lines 4b to 4i, 4j are torn from the center to the outer periphery of the module cover 1. The tearing progresses along the tear lines 4a->4b->4f->4g at the left and right back portion of the module cover 1. And, the tearing progresses along the tear lines 4c->4d at the center front portion of the module cover 1. Furthermore, the tearing progresses along the tear lines 4a->4b->4e->4h->4i and 4j at the left and right front portion of the module cover 1.

Figure 5:
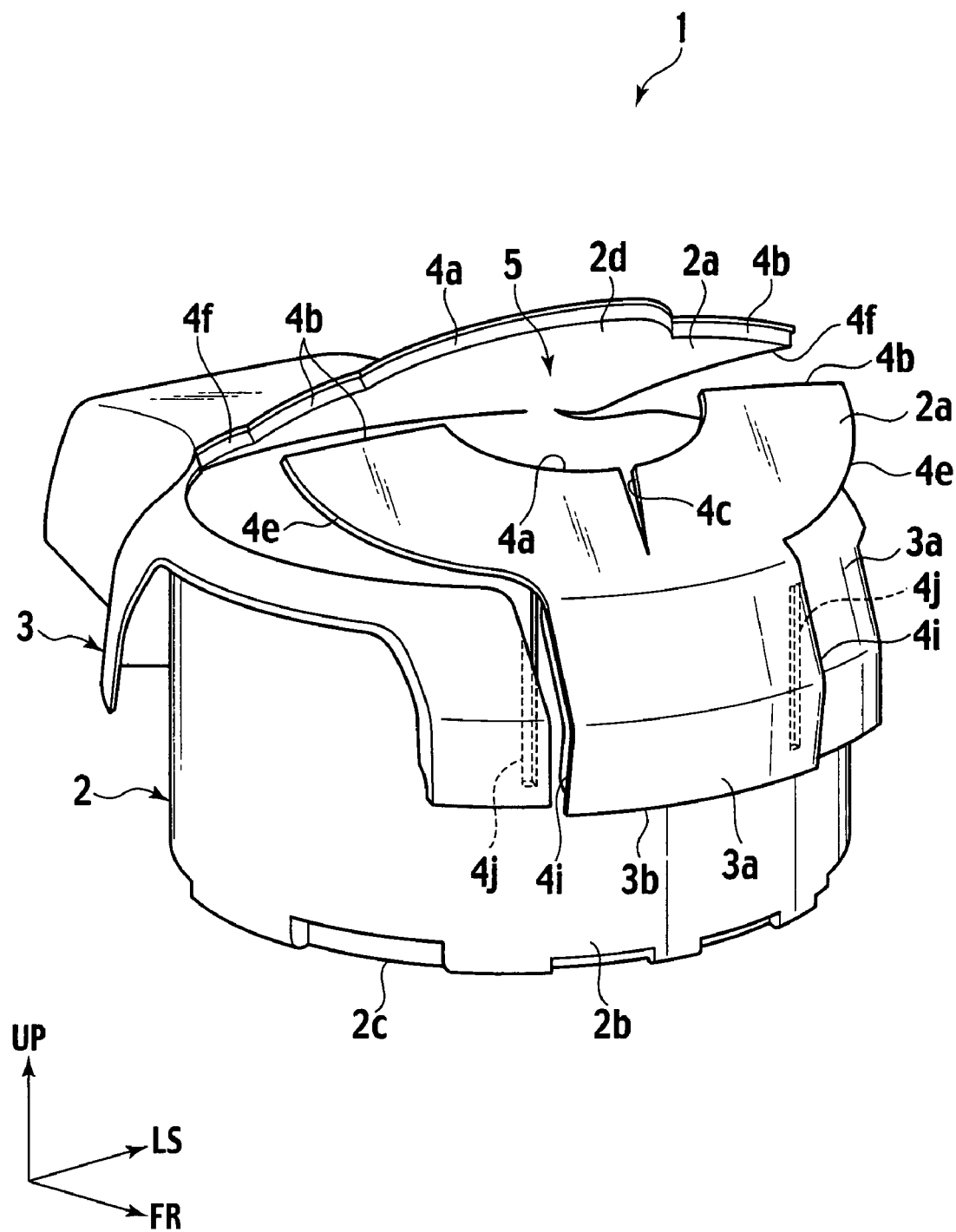
FIG. 5 is a perspective view of the airbag module cover (in an after-use condition after being torn) shown in FIG. 1.
Figure 6:
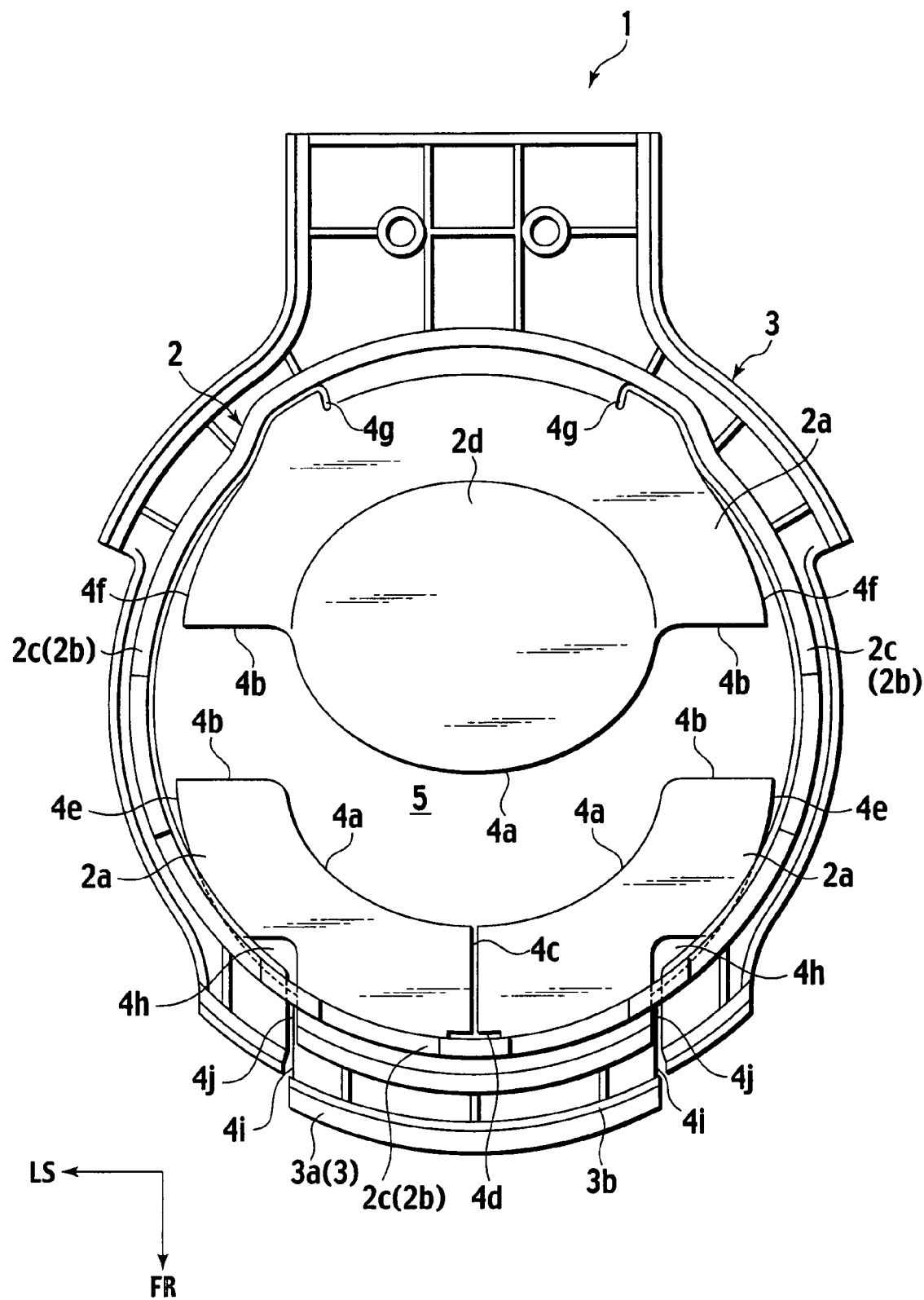
FIG. 6 is a bottom plan view (a back surface) of the airbag module shown in FIG. 5.

As a result, the side walls 2b and 3a are torn as shown FIGS. 5 and 6 to form an opening 5. The airbag inflates out from the opening 5 and deploys. In the present embodiment, the tear lines 4i, 4j extending longitudinally are provided on the side walls 2b, 3a which constitute the double-wall structure in the front portion of the module cover 1. Thus, the opening 5 can get a sufficient opening area because the torn portion of the module cover 1 can open widely as the deployment doors.

According to the above-mentioned embodiment, since the tear lines 4j are formed as the slits on the inner wall of the double-wall structure (i.e. on the inner side wall 2b) in order to reduce the strength of the double-wall portion, the module cover 1 can be torn unfailingly and the torn portion of the module cover 1 can be opened unfailingly.

In other words, since the tear lines 4j formed inside of the double-wall structure is formed as the slits among the pair of the tear lines 4i, 4j which are overlapped each other, the pressure load by the inflating airbag for tearing the tear lines can be focused only on the tear lines 4i provided outside the wide tear lines 4h. Therefore, the fast and unfailing tearing can be achieved and the designing flexibility can increase for forming a required opening shape (a required tearing state).

Furthermore, since the slit-like tear lines 4j are provided on the inner wall of the double-wall structure (i.e. on the inner side wall 2b) and covered with the outer side wall 3a, the inside of the module cover 1 is not visible through the tear lines 4j and the uncomfortable outer appearance can be prevented.

Figure 7:
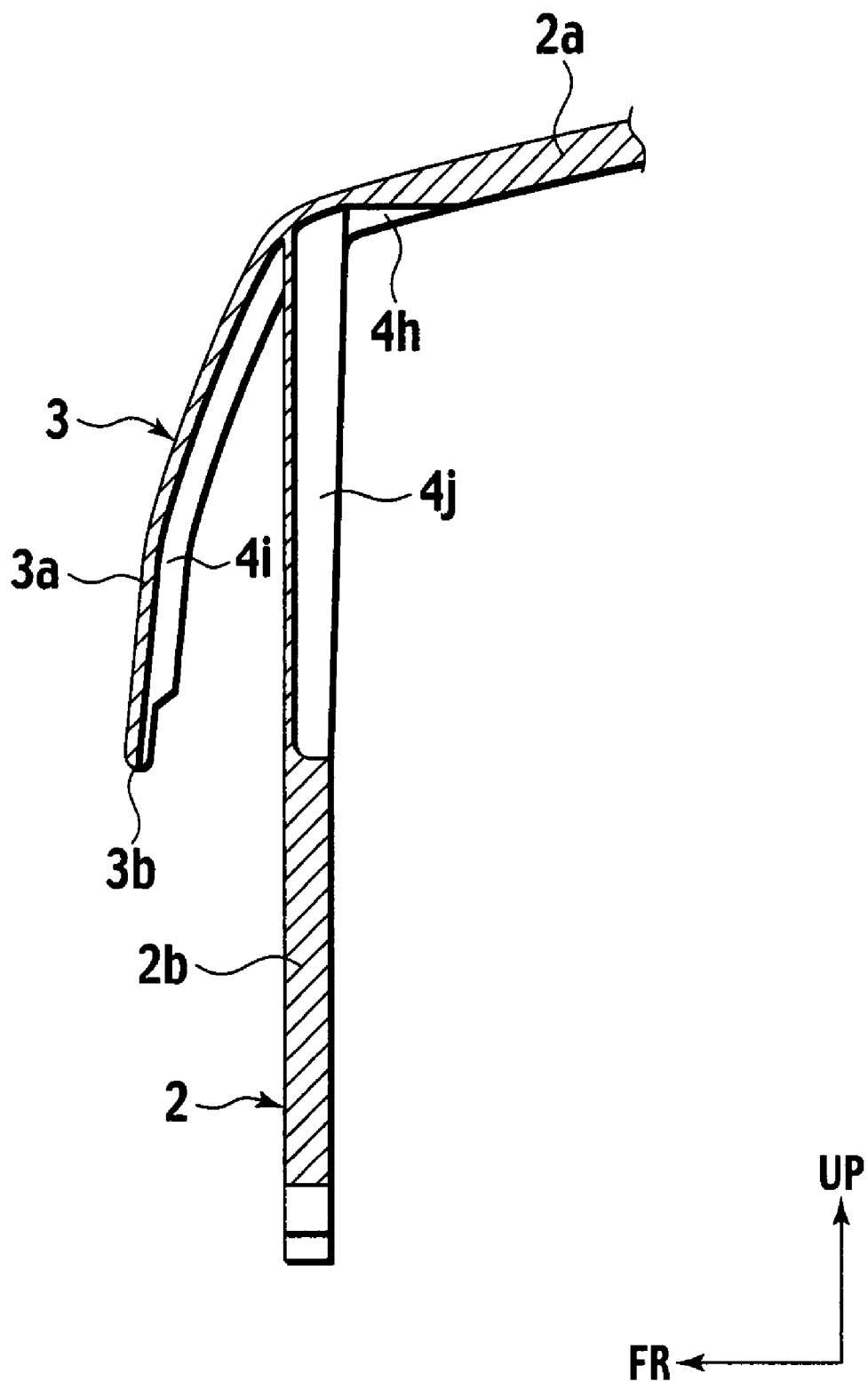
FIG. 7 is a cross-sectional view of a modified example of the first embodiment (corresponsive view of FIG. 4).

An alternative structure of the above mentioned embodiment is shown in FIG. 7. In the above-mentioned embodiment shown in FIGS. 1 to 6, the tear lines 4j provided on the inner side wall 2b are formed as the slits. However, the tear lines 4j may be formed as grooves which have thinner-thickness than the tear lines 4i provided on the outer side wall 3a. According to this structure, the inner tear lines 4j can be torn earlier than the outer tear lines 4i and the pressure load by the inflating airbag for tearing the tear lines are smoothly transmitted from the inside to the outside so as to tear the double-wall portion unfailingly.

A second embodiment of the present invention will be described with reference to FIGS. 8 to 10. The airbag module cover 101 of the present embodiment is a module cover for a driver-side airbag module as with the first embodiment. The airbag module having the module cover 101 is installed on the center of the steering wheel. The module cover 101 provides an appearance design of a wheel pad of the steering wheel. Therefore, in the present embodiments, repetitive descriptions about the "same-as" or "equivalent-to" elements of the first embodiment are omitted hereinbelow. The same or equivalent elements have the same numbers as those of the first embodiment in the drawings.

Figure 8:
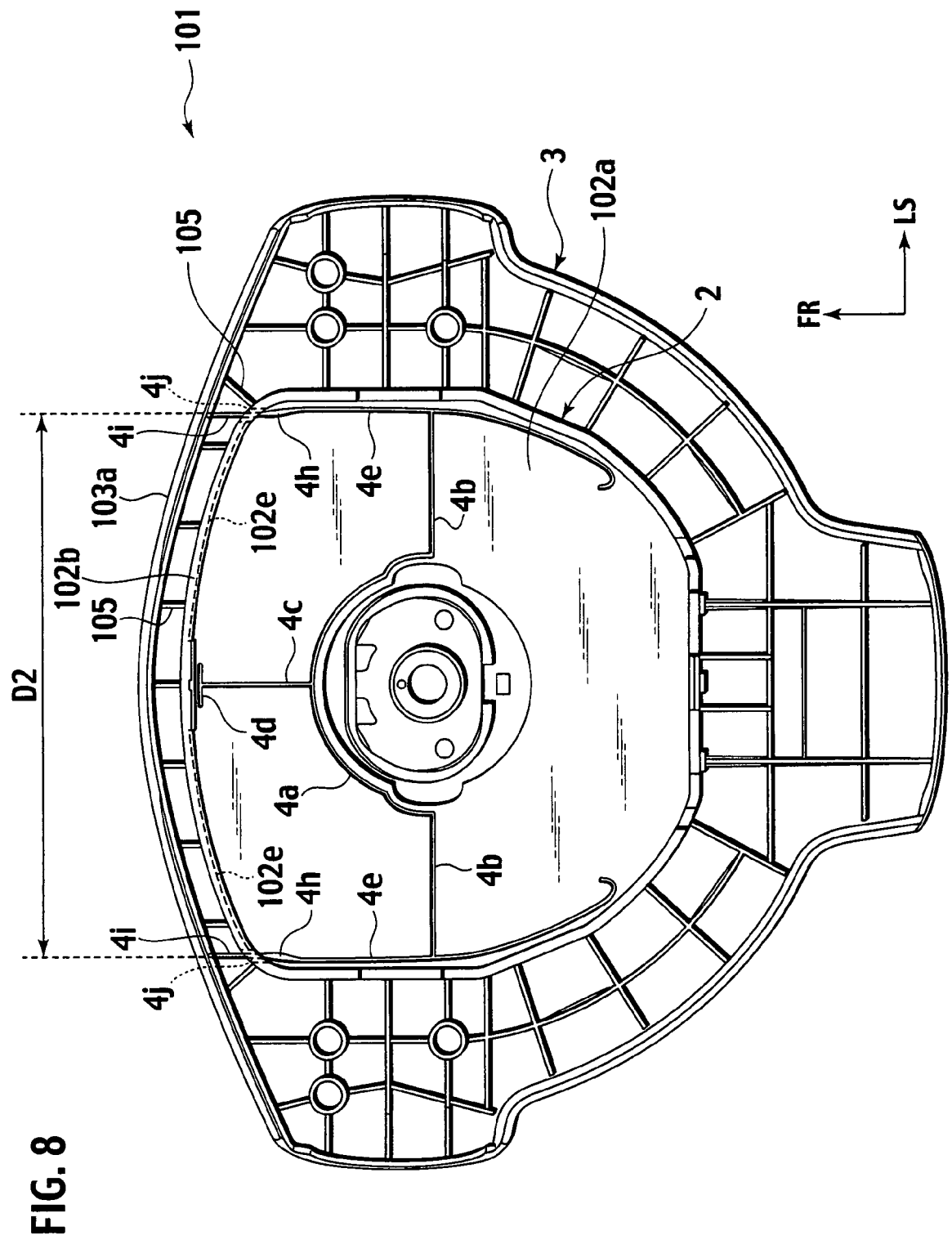
FIG. 8 is a bottom plan view (a back surface) of an airbag module cover (in a normal condition before being torn) according to a second embodiment of the present invention.

The module cover 101 of the present invention, as shown in FIG. 8, has an outer side wall 103a which has a more moderately curved outline than the outer side wall 3a of the first embodiment. The distance D2 (see FIG. 8) between the two pairs of the tear lines 4i, 4j of the present embodiment are wider than the equivalent distance D1 (see FIG. 2) of the first embodiment. The distance D2 is almost ×1.5 to ×2.0 wider than the distance D1.

A plurality of limbs 105 is provided between the inner side wall 102b and the outer side wall 103a so as to bridge the both side walls 102b and 103a. The short-height limbs 105 increase a stiffness of the wide outer side wall 103a in order not to deform with ease.

Figure 9:
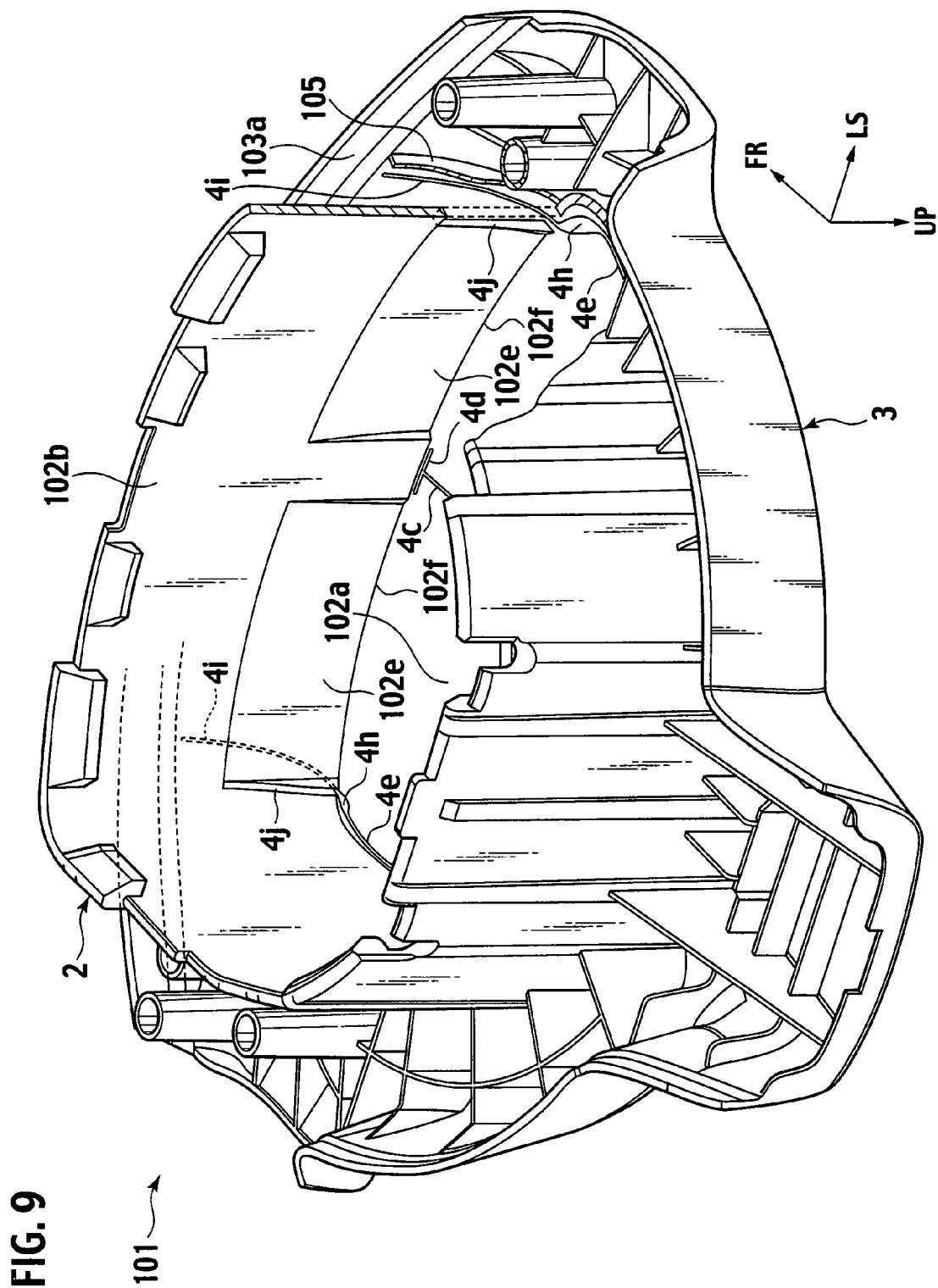
FIG. 9 is a perspective view of the airbag module shown in FIG. 8.
Figure 10:
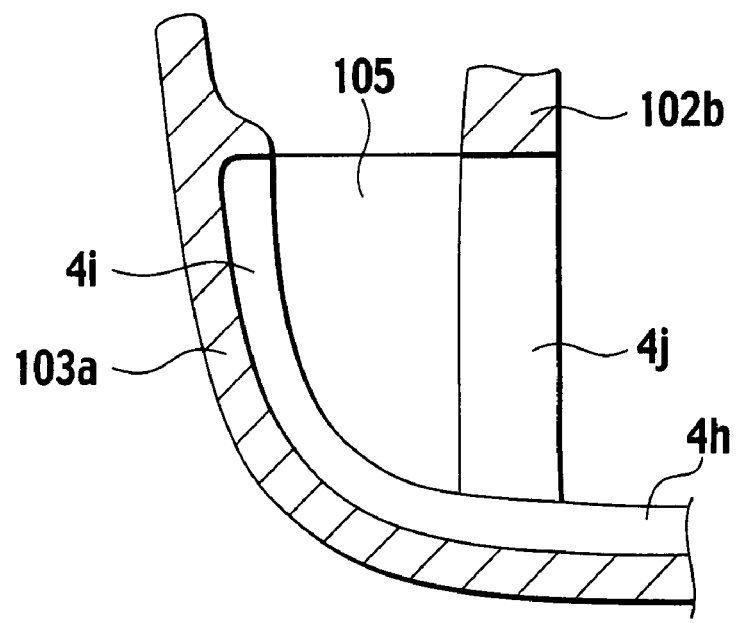
FIG. 10 is a cross-sectional view of a featured portion of the second embodiment.

As shown in FIG. 9, a pair of inclined surfaces 102e is provided on the inner surface of the inner side wall 102b. Each of the inclined surfaces 102e is positioned along a connecting line 102f between the inner side wall 102b and the top wall 102a. Since the outer surface of the inner side wall 102b is formed as a simple perpendicular plane, the inclined surfaces 102e form thin-thickness portions along the connecting line 102f.

According to the present embodiments having the above mentioned structure, since the tear lines 4j are formed as slits (see FIGS. 9 and 10) in order to reduce the strength of the double-wall portion, the module cover 101 can be torn unfailingly and the torn portion of the module cover 101 can be opened unfailingly.

In addition, since the thin-thickness portions are provided along the connecting line 102f which is corresponding to a hinge line of the deployment doors, the upper portion of the module cover can be turned over even if the distance D2 is set wide. Thus, the torn covers can be opened smoothly as the deployment doors, and the airbag inflates out from the deployment doors without inhibition.

Figure 11:
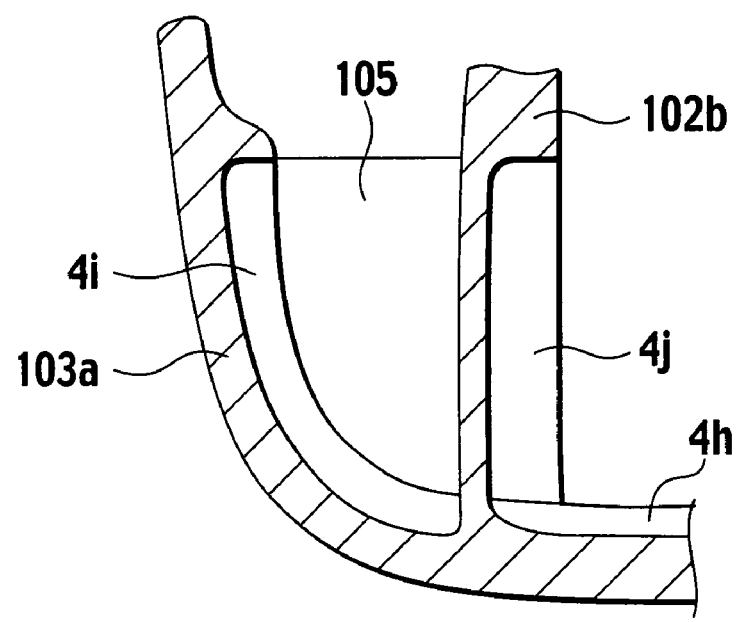
FIG. 11 is a cross-sectional view of a modified example of the second embodiment (corresponsive view of FIG. 10).

Also with the present embodiment, an alternative structure shown in FIG. 11 may be applied. As shown in FIG. 11, the tear lines 4j on the inner side wall 102b may be formed as grooves which have thinner-thicknesses than the tear lines 4i provided on the outer side wall 103a. According to this structure, the inner tear lines 4j can be torn earlier than the outer tear lines 4i and the pressure load by the inflating airbag for tearing the tear lines are smoothly transmitted from the inside to the outside so as to tear the double-wall portion unfailingly.

The preferred embodiments of the present invention have been described hereinabove. However, the present invention is not limited to the above embodiments and the various modifications can be applied within the scope of the present invention. For example, the above-mentioned embodiments have described the driver-side airbag modules to be installed on the steering wheel. However, the present invention may be applied to the airbag module installed on other vehicle components except the steering wheel. Furthermore, a pair of the tear lines at the double-wall portion doesn't have to be overlapped precisely. The pair of the tear lines at the double-wall portion may be provided with an offset position.

According to the airbag module cover of the present invention, at least one first tear line provided on an inner side wall is formed as a slit (or a thinner-thickness groove than a second tear line which is corresponding to the first tear line and provided on an outer side wall). Therefore, strength of a double-wall portion is reduced to tear the tear lines unfailingly and torn module cover can be opened unfailingly as a deployment door by an inflating airbag.

The entire content of Japanese Patent Application NO. P2006-217094 with a filing date of Aug. 9, 2006 is herein incorporated by reference. Although the invention has been described above by reference to certain embodiments of the present invention, the invention is not limited to the embodiments described above and changes will occur to those skilled in the art, in light of the teachings. The scope of the invention is defined with reference to the following claims.

What is claimed is:

1. An airbag module cover comprising:
   a top wall covering a folded airbag, the top wall configured to be opened upon airbag deployment;
   an inner side wall surrounding the folded airbag, the inner side wall being integrally formed with the top wall and raised on an inner surface of the top wall;
   an outer side wall integrally formed with the top wall and extending from an outer circumference of the top wall toward outside the inner side wall, the outer side wall configured to be opened upon airbag deployment; and
   tear lines to be torn by pressure from the airbag deployment, wherein
   the tear lines include
   a first tear groove is provided on an inner surface of the top wall,
   a second tear groove is provided on an inner surface of the outer side wall and connects with an end of the first tear groove, and
   a slit is formed on the inner side wall with the end of the first tear groove.

2. The airbag module cover according to claim 1, wherein
   at least two sets of the first tear groove, the second tear groove, and the slit are provided,
   the inner side wall has at least one thin portion between the two sets, the thin portion being thinner than other portions of the inner side wall,
   and the thin portion is provided along a connecting line at which the top wall, the inner side wall and the outer side wall are connected.

3. The airbag module cover according to claim 1, wherein
   the first tear groove is formed as a wide groove proximate an end connected with the second tear groove and is connected to the second tear groove smoothly.

* * * * *